US006489400B2

(12) United States Patent
Khandpur et al.

(10) Patent No.: US 6,489,400 B2
(45) Date of Patent: Dec. 3, 2002

(54) PRESSURE-SENSITIVE ADHESIVE BLENDS COMPRISING ETHYLENE/PROPYLENE-DERIVED POLYMERS AND PROPYLENE-DERIVED POLYMERS AND ARTICLES THEREFROM

(75) Inventors: Ashish K. Khandpur, Lake Elmo, MN (US); Greggory S. Bennett, Hudson, WI (US); Allen R. Siedle, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/746,612

(22) Filed: Dec. 21, 2000

(65) Prior Publication Data

US 2002/0120064 A1 Aug. 29, 2002

(51) Int. Cl.$^7$ .......................... C08L 23/14; C09J 123/14
(52) U.S. Cl. .................. 525/191; 525/240; 428/500; 428/343; 428/355 EN
(58) Field of Search ................. 525/191, 240; 428/500, 343, 355 EN

(56) References Cited

U.S. PATENT DOCUMENTS

| | | |
|---|---|---|
| RE24,906 E | 12/1960 | Ulrich |
| 3,492,372 A | 1/1970 | Flanagan |
| 3,635,861 A | 1/1972 | Russell |
| 3,686,107 A | 8/1972 | Russell |
| 3,798,118 A | 3/1974 | Jones |
| 3,806,558 A | 4/1974 | Fischer |
| 3,835,201 A | 9/1974 | Fischer |
| 3,850,858 A | 11/1974 | Park |
| 3,862,068 A | 1/1975 | Russell |
| 3,900,694 A | 8/1975 | Jurrens |
| 3,954,697 A | 5/1976 | McConnell et al. |
| 4,010,221 A | 3/1977 | Gebhart et al. |
| 4,013,169 A | 3/1977 | Cheney |
| 4,072,812 A | 2/1978 | McConnell et al. |
| 4,098,848 A | 7/1978 | Morris |
| 4,130,535 A | 12/1978 | Coran et al. |
| 4,143,858 A | 3/1979 | Schmidt, III et al. |
| 4,152,189 A | 5/1979 | Guerin et al. |
| 4,178,272 A | 12/1979 | Meyer, Jr. et al. |
| 4,217,428 A | 8/1980 | McConnell et al. |
| 4,220,579 A | 9/1980 | Rinehart |
| 4,259,470 A | 3/1981 | Trotter et al. |
| 4,311,628 A | 1/1982 | Abdou-Sabet et al. |
| 4,409,365 A | 10/1983 | Coran et al. |
| 4,554,324 A | 11/1985 | Husman et al. |
| 4,761,450 A | 8/1988 | Lakshmanan et al. |
| 4,789,699 A | 12/1988 | Kieffer et al. |
| 4,857,594 A | 8/1989 | Lakshmanan et al. |
| 4,957,968 A | 9/1990 | Adur et al. |
| 5,057,366 A | 10/1991 | Husman et al. |
| 5,202,361 A | 4/1993 | Zimmerman et al. |
| 5,244,962 A | 9/1993 | Plamthottam et al. |
| 5,330,829 A | 7/1994 | Miller |
| 5,397,843 A | 3/1995 | Lakshmanan et al. |
| 5,462,538 A | 10/1995 | Korpman |
| 5,478,891 A | 12/1995 | Lakshmanan et al. |
| 5,504,136 A | 4/1996 | Davis et al. |
| 5,723,546 A | 3/1998 | Sustic |
| 5,804,610 A | 9/1998 | Hamer et al. |
| 5,834,562 A | 11/1998 | Silvestri et al. |
| 5,859,114 A | 1/1999 | Davis et al. |
| 6,080,818 A | 6/2000 | Thakker et al. |
| 6,083,856 A | 7/2000 | Joseph et al. |
| 6,265,512 B1 | 7/2001 | Siedle et al. |

FOREIGN PATENT DOCUMENTS

| | | |
|---|---|---|
| EP | 0 178 062 | 4/1986 |
| EP | 0 254 002 | 1/1988 |
| EP | 0 586 937 | 3/1994 |
| EP | 0 604 917 | 7/1994 |
| EP | 0 620 257 | 10/1994 |
| GB | 1 448 391 | 9/1976 |
| GB | 2 041 949 | 9/1980 |
| JP | 48-27739 | 8/1973 |
| JP | 48-66638 | 9/1973 |
| JP | 55-69637 | 5/1980 |
| JP | 60-120775 | 6/1985 |
| JP | 11-199723 | 7/1999 |
| WO | WO 96/25469 | 8/1996 |
| WO | WO 96/26967 | 9/1996 |
| WO | WO 97/23577 | 7/1997 |
| WO | WO 98/42780 | 1/1998 |
| WO | WO 98/33858 | 9/1998 |
| WO | WO 98/54268 | 12/1998 |
| WO | WO 99/20664 | 4/1999 |
| WO | WO 99/28539 | 6/1999 |
| WO | WO 99/28540 | 6/1999 |
| WO | WO 00/01745 | 1/2000 |

OTHER PUBLICATIONS

Creanova: "Vestoplast–Klebrohstoffe fur Hot–Melt Anwendungen", Aug., 1996, Degussa–Huls, Marl XP002176337.
Adhesives Age, TechNotes: Hot Melts, "Extending Styrenic Block Copolymers with Amorphous Polyolefins," by Alicia E. Barrett and Richard A. Miller, (Aug. 1995).
Hawley's Condensed Chemical Dict. (12$^{th}$ Ed.), Revised by Richard J. Lewis, Sr., Van Nostrand Reinhold Company, New York, revised by Richard J. Lewis, Sr., pp. 103, 937, 938, and 1110, (1993).
Journal article *Macromolecules*, "Miscibility in Blends of Model Polyolefins and Corresopnding Diblock Copolymers: Thermal Analysis Studies," by D.J. Lohse, L.J. Fetters, M.J. Doyle, H.C. Wang and C. Kow, vol. 26, No. 13, pp. 3444–3447, Jun. 21, 1993.

Primary Examiner—Nathan M. Nutter
(74) Attorney, Agent, or Firm—Scott R. Pribnow

(57) ABSTRACT

The present invention relates to a blend of at least one amorphous ethylene/propylene-derived copolymer, at least one non-stereoregular propylene-derived polymer having a melt viscosity of greater than about 500 Poise, and an optional tackifier that provide pressure-sensitive adhesive compositions in which a good balance of adequate adhesion to both low and relatively high surface energy substrates can be achieved.

23 Claims, No Drawings

PRESSURE-SENSITIVE ADHESIVE BLENDS COMPRISING ETHYLENE/PROPYLENE-DERIVED POLYMERS AND PROPYLENE-DERIVED POLYMERS AND ARTICLES THEREFROM

FIELD OF THE INVENTION

The present invention relates to polymer blends comprising ethylene/propylene-derived copolymers and certain other propylene-derived polymers that exhibit pressure-sensitive adhesive properties. The pressure-sensitive adhesives are useful in preparing a wide variety of articles.

BACKGROUND OF THE INVENTION

A wide variety of references describe blends of α-olefin polymers (i.e., those polymers derived from at least one α-olefin monomer) that are used in hot-melt adhesives and heat-sealing films. However, these references do not teach formulation of such adhesives so that they possess the balance of properties (e.g., shear, peel, and tack) requisite of PSAs. For example, see U.S. Pat. No. 3,492,372 (Flanagan); U.S. Pat. No. 3,798,118 (Jones); U.S. Pat. No. 3,900,694 (Jurrens); U.S. Pat. No. 4,178,272 (Meyer, Jr. et al.); U.S. Pat. No. 4,761,450 (Lakshmanan et al.); U.S. Pat. No. 4,857,594 (Lakshmanan et al.); U.S. Pat. No. 4,957,968 (Adur et al.); U.S. Pat. No. 5,397,843 (Lakshmanan et al.); and U.S. Pat. No. 5,834,562 (Silvestri et al.). Further examples include Japanese Patent Publication Nos. 60-120775; 55-069637; 48-066638; and 73-027739.

Pressure-sensitive adhesive (PSA) compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength. Materials that have been found to function well as PSAs are polymers designed and formulated to exhibit the requisite viscoelastic properties resulting in a desired balance of tack, peel adhesion, and shear holding power. Obtaining the proper balance of properties is not a simple process.

The most commonly used polymers for preparing PSAs are natural rubber-, synthetic rubber- (e.g., styrene/butadiene copolymers (SBR) and styrene/isoprene/styrene (SIS) block copolymers), and various (meth)acrylate- (e.g., acrylate and methacrylate) based polymers. With the exception of several (meth)acrylate- and certain α-olefin-based polymers, which are inherently tacky, these polymers are typically blended with appropriate tackifiers to render them pressure-sensitive.

PSA compositions comprising polymers derived from α-olefin monomers are known. Often, such compositions include a single α-olefin polymer, typically a copolymer, which is usually blended with a tackifier. Blending an α-olefin-derived polymer with another polymer when preparing PSAs is known, however. Yet, the relative proportions of the polymers and the physical characteristics of the polymers in these blends is typically not specified.

For example, see European Patent Application No. 0 178 062 (Uniroyal, Inc.) teaches hot melt pressure-sensitive thermoplastic elastomeric adhesive compositions comprising blends of thermoplastic elastomeric polymers made from ethylene and propylene (e.g., those comprising crystalline polypropylene moieties and essentially amorphous elastomeric ethylene-propylene copolymer moieties having a melting point of at least 150° C. as measured by differential thermal analysis), tackifiers, and other optional additives, such as plasticizers, fillers, and stabilizers. Amorphous polypropylene having a ring-and-ball softening point of 149–154° C. is mentioned as an example of a suitable plasticizer. Plasticizers can comprise 5–50% by weight of the total adhesive.

Also see U.S. Pat. Nos. 3,954,697 and 4,072,812 (McConnell et al.), which teach single component, hot-melt, pressure-sensitive adhesives based on copolymers derived from propylene and 40–60 mole % (based on the copolymer) higher olefin monomers. The copolymers may be used alone or in mixture with other materials, including compatible tackifiers, amorphous polypropylene and amorphous block ethylene/propylene-derived copolymers.

U.S. Pat. No. 4,143,858 (Schmidt, III et al.) teaches amorphous polyolefin homopolymers and copolymers useful in hot-melt PSAs. The amorphous polyolefin polymers may also be blended with up to 20 weight % crystalline polyolefins. The adhesives therein may be used alone or in mixture with other materials such as amorphous polypropylene, amorphous block ethylene/propylene-derived copolymer, etc.

It is also noteworthy that many references describing blends of α-olefin derived polymers with other polymers teach blending α-olefin-derived polymers with other polymers that are rubber-based, containing conjugated dienes. For example, see U.S. Pat. No. 5,859,114 (Davis et al.), where a major amount of an ethylene-propylene-diene terpolymer is blended with a minor amount of at least one fully saturated adhesive-enhancing polymer miscible therewith and at least one tackifier. Examples of adhesive-enhancing polymers taught to be useful therein include: ethylene-vinyl acetate copolymers, ethylene-vinyl chloride copolymers, ethylene-octene copolymers, ethylene-butene copolymers, and propylene-butene-ethylene terpolymers. As described in U.S. Pat. No. 5,504,136 (Davis et al.), ethylene-propylene copolymers, such as those typically having an ethylene content of about 45–65% by weight, are also mentioned as having utility as the adhesive-enhancing polymer in a related invention.

PCT Publication No. WO 98/33,858 (American Tape Co.) describes PSAs comprising a natural or synthetic rubber and a thermoplastic polyolefin blend of ethylene/propylene rubber, hydrogenated polyisoprene, and polypropylene. Each of the constituents making up the thermoplastic polyolefin blend has a relatively low molecular weight (3,000–10,000). The PSA composition also includes a tackifier.

PCT Publication No. WO 97/23,577 (Minnesota Mining and Manufacturing Co.) describes blended PSAs that include at least two components. The first component is a PSA. For example, PSAs useful in the invention include tackified natural rubbers, synthetic rubbers, tackified styrene block copolymers, polyvinyl ethers, acrylics, poly-α-olefins (described as being predominantly amorphous), and silicones. The second component is a thermoplastic material or elastomer. For example, thermoplastic materials useful in the invention include isotactic polypropylene and ethylene/propylene copolymers. It is also taught that useful thermoplastic materials are essentially immiscible in the PSA component at use temperatures. The Abstract describes the blends therein as having a substantially continuous domain (generally the PSA) and a substantially fibrinous to schistose domain (generally the thermoplastic material). Tackifiers may be added.

UK Pat. Application No. GB 2 041 949 (The Kendall Company) discloses PSAs comprising (1) a rubbery copolymer of ethylene, a $C_3-C_{14}$ monoolefin and, optionally, a non-conjugated diene, (2) a polymer of a crystalline ethylene or propylene, and (3) a tackifying agent.

Many compositions derived from diene monomers are relatively unstable over time, such as for example, when exposed to weathering or higher temperatures (e.g., such as when hot-melt processing the compositions). Furthermore, many such compositions are relatively non-polar and do not adhere adequately to both relatively high surface energy substrates and low surface energy substrates. "Low surface energy substrates" are those that have a surface energy of less than 45 mJ/m$^2$, more typically less than 40 mJ/m$^2$ or less than 35 mJ/m$^2$. Included among such materials are polyethylene, polypropylene, acrylonitrile-butadiene-styrene, and polyamide.

Ways to effectively adhere to low surface energy materials is a challenge that those of ordinary skill in the art are attempting to overcome. Many times improvements in adherence to low surface energy substrates compromises adherence to higher surface energy substrates or compromises shear strength of the adhesive. As such, further adhesives for adequately adhering to low surface energy surfaces are desired. It is also desired that any such new adhesives will allow for broad formulation latitude and tailorability for particular applications.

It would also be desirable to formulate adhesives using lower cost materials. For example, (meth)acrylate monomers and rubber-based monomers are generally more expensive than α-olefin monomers. The present invention addresses these motivating factors.

SUMMARY OF THE INVENTION

The present invention provides an improved pressure-sensitive adhesive composition which comprises a blend of at least one ethylene/propylene-derived copolymer and at least one propylene-derived polymer. Generally, such compositions are advantageous from a cost-standpoint, as opposed to many traditional pressure-sensitive adhesive compositions (e.g., (meth)acrylate and rubber-based adhesive). Furthermore, α-olefin-derived polymers, which include ethylene/propylene-derived copolymers and propylene-derived polymers, are conducive to being recycled, particularly when used in conjunction with other α-olefin-derived polymers (e.g., materials commonly used in packaging). It is beneficial to use materials in adhesive compositions that can be later recycled.

The blends of the present invention are useful in adhering to various substrates including relatively high surface energy substrates, such as glass and metals, as well as low surface energy substrates, such as polyethylene and polypropylene. They may be used in a wide variety of applications, such as in adhesive tapes and sheets and in the application of polymeric films to a wide variety of substrates. They may also be used in the preparation of blown microfiber webs.

Surprisingly, in preferred embodiments of the invention, peel adhesion to low surface energy substrates, such as polyethylene and polypropylene, is enhanced without causing detrimental effects in peel adhesion to high surface energy substrates. For example, certain embodiments of the invention provide substrates, which can be polypropylene, polyethylene, or glass, with the pressure-sensitive adhesive composition at least partially applied thereon. In these embodiments, the 180° peel adhesion to the substrate can be as high as at least about 100 N/dm. Useful shear strengths are also realizable using the blends of this invention.

DETAILED DESCRIPTION OF THE PREFERRED EMBODIMENTS

Pressure-sensitive-adhesive (PSA) blends of the present invention comprise at least one ethylene/propylene-derived copolymer and at least one propylene-derived polymer. Preferably, the PSA blend comprises a single domain system. Single domain systems, as well as other terms used throughout, are defined in turn below.

"Single Domain" systems are those where, when analyzed using Dynamic Mechanical Analysis (DMA) in a parallel plate geometry at a temperature increment of 2° C./minute, a frequency of 1 radian/second, and a maximum strain of 2%, only one tan delta peak (without a "shoulder") representing a glass transition temperature is present. Typically, these systems involve polymers that form a miscible system at use temperature (e.g., room temperature). "Miscible systems" are those systems comprising at least two materials forming a single domain system. It is advantageous to have single domain systems. For example, single domain systems often do not require additives (e.g., compatibilizers) to ensure storage stability of the system. Also, single domain systems facilitate reproducible compositions (i.e., the compositions have similar mechanical properties), even when the compositions are prepared using a range of different processing equipment.

"Polymer" refers to macromolecular materials having at least five repeating monomeric units, which may or may not be the same. The term "polymer", as used herein, encompasses homopolymers and copolymers. Copolymers of the invention refer to those polymers derived from at least two chemically different monomers. Included within the definition of copolymers are traditional copolymers derived from at least five monomers, which include only two chemically different types of monomers, as well as terpolymers, which include at least three chemically different types of monomers, etc.

In general, a polymer can include more than one type of steric structure throughout its chain length. For example, polymers can include crystalline, stereoregular isotactic and syndiotactic structures, as well as amorphous, atactic structures, or combinations thereof. The steric structure of a polymer can be determined using any suitable method. For example, carbon-13 Nuclear Magnetic Resonance can be used to determine the steric structure (i.e., tacticity) of a polymer.

"Stereoregular" structures, as defined by *Hawley's Condensed Chemical Dictionary* (12th Edition), are those whose molecular structure has a definite spatial arrangement, rather than the random and varying arrangement that characterizes an amorphous polymer. Stereoregular structures include isotactic and syndiotactic structures.

"Isotactic" structures, as defined by *Hawley's Condensed Chemical Dictionary* (12th Edition), are those whose structure is such that groups of atoms that are not part of the backbone structure are located either all above, or all below, atoms in the backbone chain, when the latter are all in one plane.

"Syndiotactic" structures, as defined by *Hawley's Condensed Chemical Dictionary* (12th Edition), are those whose structure is such that groups of atoms that are not part of the backbone structure are located in some symmetrical and recurring fashion above and below the atoms in the backbone chain, when the latter are all in one plane.

"Atactic" structures, as defined by *Hawley's Condensed Chemical Dictionary* (12th Edition), are those whose structure is such that groups of atoms are arranged randomly above and below the backbone chain of atoms, when the latter are all in one plane.

The "Stereoregular Index (S.I.)" of a polymer is defined as follows: In a perfectly atactic polymer, two homotactic triads, mm and rr, are present in equal amounts (25% each). As the polymer becomes increasingly stereoregular, the relative amounts of mm and rr change so that one increases to be greater than the other. S.I. is the ratio of the larger of mm or rr to the smaller of mm or rr and is always positive and greater than 1. S.I. expresses, in a numerical way, how the steric structure of a polymer shifts away from 1.0 for a random, atactic polymer to larger values characteristic of more stereoregular polymers.

"Non-stereoregular" polymers are generally mostly atactic or mostly semi-syndiotactic polymers, rather than mostly isotactic or mostly syndiotactic.

"Semi-syndiotactic" polymers are those having structures between mostly syndiotactic polymers and mostly atactic polymers.

In one embodiment, non-stereoregular polymers of the invention have an S.I. of 1 to about 10. In another embodiment, non-stereoregular polymers of the invention have an S.I. of 1 to about 7. In still a further embodiment, non-stereoregular polymers of the invention have an S.I. of 1.5 to about 7. In yet another embodiment, non-stereoregular polymers of the invention have an S.I. of 1 to about 1.1.

"Amorphous" polymers are those polymers that are hexane soluble at room temperature. Recognize that such materials may have a small degree of crystallinity, which is detectable, for example, using x-ray or thermal analysis. Amorphous polymers lack a well-defined melting point when measured by Differential Scanning Calorimetry (DSC). Particularly preferred are those amorphous polymers having mostly atactic structures.

Polymers that have less stereoregularity have been found to be preferred for processing and preparing PSAs of the invention, such as for example, by hot-melt processing. Furthermore, materials that are highly isotactic tend to be opaque, while those that are less stereoregular tend to be more transparent. The clarity (i.e., transparency) of materials with low stereoregularity makes them preferred for use in applications where clarity of the adhesive is important. For example, such applications include bonding of glass and transparent plastics.

One advantage of utilizing blends of the invention is the greater formulation latitude that they provide. That is, changes in a wide variety of physical properties of films comprising the blends can be effectuated, for example, by varying the ratio of individual polymers in the blends. Furthermore, cost effectiveness is another advantage of utilizing blends. For example, less expensive polymers can be blended with more expensive polymers. In that way, the less expensive polymers can act as an "extender" for the more expensive polymers. Also, using blends can provide advantageous synergistic effects, wherein, for a certain application, the blend can perform substantially better than either polymer by itself for the same application.

PSA blends of the invention are particularly useful for adhering to both relatively high and low surface energy materials. PSA blends of the invention are capable of providing adequate or improved peel adhesion to such substrates. For example, certain embodiments of the invention provide substrates, which can be polypropylene, polyethylene, or glass, with the pressure-sensitive adhesive composition at least partially applied thereon. In these embodiments, the 180° peel adhesion to the substrate can be as high as at least about 100 N/dm. Certain PSA formulations of the invention are also capable of providing compositions having useful shear strengths.

Ethylene/Propylene-Derived Copolymer

Any suitable ethylene/propylene-derived copolymer can be used in the present invention. Generally, however, the ethylene/propylene-derived copolymers of the invention are amorphous. As such, the compositions of the invention are able to have enhanced pressure-sensitive adhesive properties, often without the need for using substantial amounts of additives, such as plasticizers or liquid oils. The ethylene/propylene-derived copolymers themselves may or may not have pressure sensitive-adhesive properties. Furthermore, the use of amorphous ethylene/propylene-derived copolymers facilitates obtaining a single domain system. In contrast, when only crystalline α-olefin polymers are used instead of at least one amorphous ethylene/propylene-derived copolymer, crystallization-induced phase separation may be encountered in the composition, impairing obtainment of a single domain system.

Another preferred aspect of the invention relates to the type of ethylene/propylene-derived copolymer used. While any suitable ethylene /propylene-derived copolymer, including block- and random-copolymers, can be used in accordance with the present invention, the use of at least one random-ethylene /propylene-derived copolymer is preferred. As with using amorphous ethylene/propylene-derived copolymers, the fact that the copolymer is random in a preferred embodiment also facilitates obtainment of a single domain system.

The ethylene/propylene-derived copolymer is derived from at least one ethylene monomer and at least one propylene monomer. While other monomers, including diene monomers, may be copolymerized with the ethylene and propylene monomers, when preparing the ethylene/propylene-derived copolymers, the ethylene/propylene-derived copolymer of the invention is derived from essentially no diene monomers. As discussed previously, many compositions derived from diene monomers are relatively unstable over time, such as for example, when exposed to weathering or higher temperatures (e.g., when hot-melt processing). Furthermore, many compositions derived from diene monomers are relatively non-polar and do not adhere adequately to both relatively high surface energy substrates and low surface energy substrates.

It is preferred that the ethylene/propylene-derived copolymer is derived from a major portion of propylene monomers. That is, the largest mole % of monomers from which the ethylene/propylene-derived copolymer is derived is that for propylene monomers. Similarly, it is preferred that the ethylene/propylene-derived copolymer contains less than about 35% by weight, more preferably less than 30% by weight, even more preferably less than about 25% by weight, and even more preferably less than about 15% by weight repeat monomeric units derived from ethylene monomers.

Any suitable amount of ethylene monomer may be used to prepare the ethylene/propylene-derived copolymer as long as the resulting copolymer is amorphous. Generally, however, the greater the proportion of ethylene monomer used, the more likely it is that the resulting copolymer will not be amorphous.

Particularly useful are the ethylene/propylene-derived copolymers with a glass transition temperature (Tg) of about −50° C. to about 0 C., preferably greater than −40° C. to about 0° C., and more preferably about −30° C. to about 0° C. Generally, when the Tg of the ethylene/propylene-derived copolymer is lower than −50° C., it is because a larger proportion of ethylene monomer was used in preparation of the copolymer. While some such copolymers may be useful for certain embodiments of the invention, as discussed above, these polymers may not be amorphous. Furthermore, it is preferred that the Tg of the ethylene/propylene-derived copolymer is greater than about −50° C. in order to reduce the necessity for adding a tackifier, or at least a large amount of tackifier, to the composition in order to obtain PSA properties for room temperature applications. The Tg of a polymer is measurable using Differential Scanning Calorimetry using second heat measurements at 10° C. per minute.

Examples of ethylene/propylene-derived copolymers useful in the present invention include polymers commercially available from Eastman Chemical; Kingsport, TN under the EASTOFLEX tradename and polymers commercially available from The International Group; Wayne, PA under the KTAC.tradename. Specific examples of suitable ethylene/propylene-derived copolymers from these companies are those with a Tg of about −33° C. to about −23° C., such as EASTOFLEX E1060, EASTOFLEX E1200, and KTAC6013.

Propylene-Derived Polymer

Any suitable polymer can be used for the propylene-derived polymer. The propylene-derived polymers themselves, may or may not have PSA properties. Generally, the propylene-derived polymer is non-stereoregular.

The propylene-derived polymer is derived from at least propylene monomer. While other types of monomers may be used in their preparation, preferably, the propylene-derived polymer is derived from at least 60 percent by weight, more preferably at least about 80 percent by weight, and most preferably essentially 100 percent by weight, propylene monomers. As such, it is also preferred that the propylene-derived polymer contains a saturated hydrocarbon backbone. Accordingly, preferably the propylene-derived polymer is derived from essentially no diene monomers. As discussed previously, many compositions derived from diene monomers are relatively unstable over time, such as for example, when exposed to weathering or higher temperatures (e.g., when hot-melt processing). Furthermore, many compositions derived from diene monomers are relatively non-polar and do not adhere adequately to both relatively high surface energy substrates and low surface energy substrates.

Propylene-derived polymers of the invention are of high enough molecular weight that they do not act as a tackifier or plasticizer. That is, the weight average molecular weight of the propylene-derived polymer is at least about 10,000 grams/mole. Preferably, the weight average molecular weight of the propylene-derived polymer is at least about 30,000 grams/mole, even more preferably at least about 50,000 grams/mole, and even more preferably at least about 70,000 grams/mole. Particularly useful are polymers with a weight average molecular weight of about 70,000–1,000,000 grams/mole, preferably about 70,000–200,000 grams/mole.

The preferred Tg of these polymers is about −15° C. to about 10° C., more preferably about −10° C. to about 5° C. The use of at least one propylene-derived polymer having such a preferred Tg facilitates formation of a composition having PSA properties. Again, the Tg of a polymer is measurable using Differential Scanning Calorimetry using second heat measurements at 10° C. per minute.

The preferred melt viscosity of the propylene-derived polymer is greater than 500 Poise, more preferably greater than about 750 Poise, when measured at 190° C. according to the Viscosity Test method in the Examples section, infra. In a further embodiment, the melt viscosity of the propylene-derived polymer is greater than about 2,500 Poise when measured at 190° C. according to the Viscosity Test method. In still a further embodiment, the melt viscosity of the propylene-derived polymer is greater than about 10,000 Poise when measured at 190° C. according to the Viscosity Test method. Generally, the higher the melt viscosity of the propylene-derived polymer, the more likely it is that the resulting composition will have a higher shear strength in conjunction with improved peel adhesion properties. This is particularly beneficial when preparing PSA compositions of the invention for high performance applications.

Any suitable propylene-derived polymer can be used in blends of the invention. When higher molecular weight propylene-derived polymers are preferred, those polymers prepared using a metallocene catalyst, such as in PCT Publication No. WO 99/20,664, are particularly useful. Typically, polymers prepared using a metallocene catalyst (i.e., metallocene-generated polymers) have a weight average molecular weight of greater than about 70,000 grams/mole, which is typically higher than the molecular weight of many commercially available non-stereoregular propylene-derived polymers. A similar comparison applies when comparing melt viscosities of the polymers. Propylene-derived polymers prepared using metallocene catalysts may be preferred when PSA compositions having higher shear strength are desired in conjunction with improved peel adhesion properties. The higher molecular weight of the propylene-derived polymers prepared using a metallocene catalyst also enables them to be more usefully crosslinked, as compared to those propylene-derived polymers having lower molecular weights. This may be the case, when for example, the PSAs are to be used in a high performance application.

As stated previously, however, one advantage of the present invention is that the blends are tailorable for a wide variety of applications. Higher molecular weight polymers may not always be preferred depending on the application. For example, lower molecular weight polymers may be preferred when using the PSA composition to form a melt-blown fiber. PSA blends of the invention may be advantageously used to prepare blown microfiber webs, for example. Addition of a lower molecular weight polymer to a conventional polymer composition in accordance with the invention tends to lower the melt viscosity of the polymer composition at a given processing temperature. Therefore, the use of polymer blends of the invention may facilitate melt blowing fibers from PSA compositions at lower temperatures than those used to melt-blow fibers from conventional PSA compositions. Also, the use of polymer blends of the invention may facilitate a higher throughput of melt-blown fibers at a given processing temperature.

To facilitate forming a single domain PSA system, it is preferred that the propylene-derived polymer be a non-stereoregular polymer. That is another reason why metallocene-catalyzed propylene-derived polymers, such as those described in PCT Publication No. WO 99/20,664, are useful due to their generally lower stereoregularity. Such polymers are generally either amorphous or semi-syndiotactic. However, in this preferred embodiment, any suitable non-stereoregular polymer can be used.

According to one aspect of the invention, the stereoregularity index (S.I.) of the propylene-derived polymer is about 1.0 to about 5.0. Preferably, when the propylene-derived polymer is amorphous, its S.I. is about 1.0 to about 1.05. Preferably, when the propylene-derived polymer is semi-syndiotactic, its stereoregularity index (S.I.) is about 1.1 to about 4.0.

Optional Tackifier

Tackifiers of the invention have a weight average molecular weight of less than about 10,000 grams/mole and may be a in a solid or liquid state. The compositions of the invention may include a tackifier, where necessary to impart the desired PSA properties. Those of ordinary skill in the art recognize that a wide variety of tackifier are suitable for this purpose. Although a tackifier can be used as understood by one of ordinary skill in the art, generally, if present, the compositions include less than about 60% by weight tackifiers.

Preparation of Blends

PSA compositions of the invention include at least one ethylene/propylene-derived copolymer and at least one propylene-derived polymer. Other additives (e.g., antioxidants and ultraviolet stabilizers) may also be added to the PSA compositions, depending on the desired application and as well known to one of ordinary skill in the art.

Each of the ethylene/propylene-derived copolymer and propylene-derived polymer components of the blend is preferably present in an amount of about 5 weight % to about 95 weight % based on total weight of the blend. More preferably, each of the components is present in an amount of at least about 10 weight % based on total weight of the blend. Typically, however, the ethylene/propylene-derived copolymer component is present in a major portion and the propylene-derived polymer component is present in a minor portion based on total weight of the two components. This ratio of components contributes to cost-effectiveness and easier hot-melt processability of the composition. Furthermore, this ratio of components contributes to obtainment of compositions having adequate adhesion to both relatively high surface energy substrates and low surface energy substrates. It has also been found that this ratio facilitates formation of compositions having PSA properties by helping to lower the overall Tg of the composition.

Blending of the polymers is done by any method that results in a substantially homogeneous distribution of the polymers. The polymers can be blended using several methods. In particular, the polymers can be blended by melt blending, solvent blending, or any suitable physical means.

For example, the polymers can be melt blended by a method as described by Guerin et al. in U.S. Patent No. 4,152,189. That is, all solvent (if used) is removed from each polymer by heating to a temperature of about 150° C. to about 175° C. at a pressure of about 5 Torr to about 10 Torr. Then, the polymers are weighed into a vessel in the desired proportions. The blend is then formed by heating the contents of the vessel to about 175° C., while stirring.

Although melt blending is preferred, the PSA blends of the present invention can also be processed using solvent blending. In that case, the polymers in the blend should be substantially soluble in the solvents used.

Physical blending devices that provide dispersive mixing, distributive mixing, or a combination of dispersive and distributive mixing are useful in preparing homogenous blends. Both batch and continuous methods of physical blending can be used. Examples of batch methods include those methods using BRABENDER (e.g., a BRABENDER PREP CENTER, available from C. W. Brabender Instruments, Inc.; South Hackensack, N.J.) or BANBURY internal mixing and roll milling (available from FARREL COMPANY; Ansonia, Conn.) equipment. Examples of continuous methods include single screw extruding, twin screw extruding, disk extruding, reciprocating single screw extruding, and pin barrel single screw extruding.

Applications

The PSA compositions of the present invention can be readily applied to a substrate. For example, the PSA composition can be applied to sheeting products (e.g., decorative, reflective, and graphical), labelstock, and tape backings. The substrate can be any suitable type of material depending on the desired application. Typically, the substrate comprises a nonwoven, paper, polymeric film (e.g., polypropylene (e.g., biaxially oriented polypropylene (BOPP)), polyethylene, polyurea, or polyester (e.g., polyethylene terephthalate (PET)), or release liner (e.g., siliconized liner).

PSA compositions according to the present invention can be utilized to form tape, for example. The PSA is applied to at least one side of the backing. The PSA may then be crosslinked to further improve the shear strength of the PSA. Any suitable crosslinking method (e.g., exposure to radiation, such as ultraviolet or electron beam) or crosslinker additive (e.g., phenolic and silane curatives) may be utilized.

When double-sided tapes are formed, the PSA is applied to at least a portion of both sides of the backing. Alternatively, a release material (e.g., low adhesion backsize) can be applied to the opposite side of the backing, if desired. Advantageously, the PSA and/or release material, for example, can be coextruded with the film backing for ease of processing.

The PSA can be applied to a substrate using methods well known to one of ordinary skill in the art. For example, the PSA can be applied using melt extrusion techniques. The PSA composition can be applied by either continuous or batch processes. An example of a batch process is the placement of a portion of the PSA composition between a substrate to which the PSA is to be adhered and a surface capable of releasing the PSA to form a composite structure. The composite structure can then be compressed at a sufficient temperature and pressure to form a PSA layer of a desired thickness after cooling. Alternatively, the PSA composition can be compressed between two release surfaces and cooled to form, for example, a transfer tape.

Continuous forming methods include drawing the PSA composition out of a heated film die and subsequently contacting the drawn composition to a moving plastic web or other suitable substrate. A related continuous forming method involves extruding the PSA composition and a coextruded release material and/or backing from a film die and cooling the layered product to form an adhesive tape. Other continuous forming methods involve directly contacting the PSA composition to a rapidly moving plastic web or other suitable preformed substrate. Using this method, the PSA composition is applied to the moving preformed web using a die having flexible die lips, such as a conventional film or sheeting die. After forming by any of these continuous methods, the films or layers can be solidified by quenching using both direct methods (e.g., chill rolls or water baths) and indirect methods (e.g., air or gas impingement). Blown microfibers can also be prepared using another continuous forming method. Examples of this process can be found, for example, in PCT Publication No. WO 99/28,539.

Although coating out of solvent is not preferred, the PSA compositions can be coated using a solvent-based method. For example, the PSA composition can be coated by such methods as knife coating, roll coating, gravure coating, rod coating, curtain coating, and air knife coating. The coated solvent-based PSA composition is then dried to remove the solvent. Preferably, the applied solvent-based PSA composition is subjected to elevated temperatures, such as those supplied by an oven, to expedite drying.

The PSA compositions, coatings, and tapes therefrom are exemplified in the following examples. These examples are merely for illustrative purposes and are not meant to be limiting to the scope of the appended claims. All parts, percentages, ratios, etc. in the examples and the rest of the specification are by weight unless indicated otherwise.

EXAMPLES

Test Methods

The following test methods were used to characterize the PSA blends produced in the following examples:

180° Peel Adhesion

This peel adhesion test is similar to the test method described in ASTM D 3330-90, substituting a glass or polypropylene substrate for the stainless steel substrate described in the test.

Adhesive-coated strips, which had equilibrated at constant temperature (22° C.) and humidity (50% relative humidity) for at least 24 hours, were adhered to a substrate panel, either solvent-washed glass, polypropylene (PP) (commercially available from Aeromat Plastics; Burnsville, Minn.) or high-density polyethylene (HDPE) (commercially available from Aeromat Plastics; Burnsville, Minn.) using a 2 kilogram roller passed once over the strip. The bonded assembly was allowed to dwell at room temperature for less than one minute. The assembly was then tested for 180° peel adhesion using an IMASS slip/peel tester (Model 3M90, commercially available from Instrumentors Inc., Strongsville, Ohio) at a rate (i.e., crosshead speed) of 30 centimeters/minute (12 inches/minute).

Shear Strength

This shear strength test is similar to the test method described in ASTM D 3654-88. Adhesive-coated strips, which had equilibrated at constant temperature (22° C.) and humidity (50% relative humidity) for at least 24 hours, were cut into 1.27 centimeter (0.5 inch) strips. Each strip was adhered to a stainless steel panel such that a 1.27 centimeter (0.5 inch) by 2.54 centimeter (1 inch) portion of the strip was in firm contact with the panel and one end of the strip hung free. The panel with the adhesive-coated strip attached was held in a rack such that the panel formed an angle of 178° with the extended free end, which was tensioned by application of a force of one kilogram applied as a hanging weight. The 2° less than 180° was used to negate any peel forces, thus ensuring that only shear forces were measured, in an attempt to more accurately determine the holding power of the tape being tested. The time elapsed for each tape example to separate from the test panel was recorded as the Shear Strength. Unless otherwise noted, all shear failures reported herein were cohesive failures of the adhesive (residue left on the panel), adhesive failure is denoted as A (no residue left on the panel). If the test sample did not fail at 10,000 minutes, the test was stopped and a shear value of 10,000 minutes was recorded.

Viscosity Test

Melt viscosity was measured as the complex viscosity using Dynamic Mechanical Analysis (DMA) in a parallel plate rheometer (RDA II, Rheometrics, Inc; Piscataway, N.J.) while the sample was heated from room temperature to 200° C. at a rate of 2° C./minute, a frequency of 1 radian/second, and a maximum strain of 10%. The melt viscosity at 190° C. measured according to this method is referenced throughout this application.

Table of Abbreviations

| Abbreviation/Trade Designation | Description |
|---|---|
| APP | Amorphous polypropylene |
| EASTOFLEX E1060 | ethylene/propylene-derived copolymer commercially available from Eastman Chemical Company; Kingsport, TN |
| EASTOFLEX E1200 | ethylene/propylene-derived copolymer commercially available from Eastman Chemical Company; Kingsport, TN |
| EASTOFLEX P1010 | propylene-derived homopolymer with a 190° C. viscosity of 1,000 milliPascal seconds (10 poise), commercially available from Eastman Chemical Company; Kingsport, TN |
| EASTOFLEX P1023 | propylene-derived homopolymer with a 190° C. viscosity of 2,300 milliPascal seconds (23 poise), commercially available from Eastman Chemical Company; Kingsport, TN |
| HDPE | high-density polyethylene |
| KTAC 2015 | propylene-derived homopolymer with a 190° C. viscosity of 2,200 milliPascal seconds (22 poise), commercially available from The International Group, Inc.; Wayne, PA |
| KTAC 6013 | ethylene/propylene-derived copolymer, commercially available from The International Group, Inc.; Wayne, PA |
| mPP-1 | atactic polypropylene prepared using metallocene catalysts as described in PCT Publication No. WO 99/20,664, Example 18B, with an approximate $M_w$ of 103,000 grams/mole, an approximate $M_w/M_n$ ratio of 4, and a melt viscosity, as measured according to the Viscosity Test method at 190° C., of approximately 780 Poise |
| mPP-2 | atactic polypropylene prepared using metallocene catalysts as described in PCT Publication No. 99/20,664, Example 18B, with an approximate $M_w$ of 220,000 grams/mole, an approximate $M_w/M_n$ ratio of 2.8, and a melt viscosity, as measured according to the Viscosity Test method at 190° C., of approximately 19,000 Poise |
| mPP-3 | semi-syndiotactic polypropylene prepared using metallocene catalysts as described in WO 99/20,664, Example 18S, with an approximate $M_w$ of 170,000 grams/mole, an approximate $M_w/M_n$ ratio of 14, and a melt viscosity, as measured according to the Viscosity Test method at 190° C., of approximately 43,500 Poise |
| PET | an aminated-polybutadiene primed polyester film of polyethylene terephthalate having a thickness of 38 micrometers |
| PP | polypropylene |
| REGALREZ 1126 | hydrogenated tackifier resin, commercially available from Hercules Inc.; Wilmington, DE |
| REXTAC RT2180 | propylene-derived homopolymer with a 190° C. viscosity of 8,000 milliPascal seconds (80 poise), commercially available from Huntsman Corp.; Salt Lake City, UT |
| TRIAZINE CROSSLINKER | triazine photocrosslinker, 2,4-bis(trichloromethyl)-6-(4-methoxyphenyl)-1,3,5-triazine CAS reg. No. 3584-23-4. |

-continued

Table of Abbreviations

Abbreviation/
Trade Designation    Description

WINGTACK PLUS    $C_5$ hydrocarbon tackifier resin, commercially available from Goodyear
                 Tire & Rubber Company; Akron, OH Comparative Examples C1-A to C1-E PSA tapes of the materials EASTOFLEX E1060, EASTOFLEX E1200, KTAC. 6013, mPP-1, and mPP-3 were prepared to determine their respective PSA properties. Each of the materials was first homogenized for 10 minutes in a 30 cm³ capacity BRABENDER batch mixer at about 170° C. and 50 revolutions per minute, followed by air cooling. Total charge to the mixer was 20 grams. The homogenized materials were then pressed into approximately 51-micrometer-thick films by applying a 6–8 ton compressive force for 1–2 minutes using a CARVER press available from Carver, Inc; Wabash, Ind. and having platens separated by 51-micrometer-thick shims. The platens were each maintained at a temperature of about 125–150° C. The compressed films were then each laminated to a 46-micrometer-thick, primed PET backing. Tape strips, each 1.27 centimeters (0.5 inch) wide, were cut from the resulting laminate and tested for peel and shear properties according to the test methods, supra. Results are summarized in Table C1.

TABLE C1

| Ex. | Material | 180° Peel Adhesion to Glass (N/dm) | 180° Peel Adhesion to PP (N/dm) | Room Temperature Shear Strength* (minutes) |
|---|---|---|---|---|
| C1-A | EASTOFLEX E1060 | 1 | 29 | 14 A |
| C1-B | EASTOFLEX E1200 | 45 | 67 | 223 |
| C1-C | KTAC 6013 | 6 | 54 | 0 A |
| C1-D | mPP-1 | 30 | 64 | 159 |
| C1-E | mPP-3 | 22 | 46 | 10 A |

*"A" denotes adhesive failure

Comparative Examples C2-A to C2-D

PSA tapes comprising mPP-3 and REGALREZ 1126 were prepared to determine the PSA properties of mPP-3 when it is tackified, but not blended. The tapes were prepared as described for Comparative Examples C1-A to C1-E. The tapes were then tested for peel and shear properties according to the test methods, supra. Results are summarized in Table C2.

TABLE C2

| Ex. | mPP-3 (parts by weight) | REGALREZ 1126 (parts by weight) | 180° Peel Adhesion to Glass (N/dm) | 180° Peel Adhesion to PP (N/dm) | Room Temperature Shear Strength* (minutes) |
|---|---|---|---|---|---|
| C2-A | 100 | 0 | 22 | 46 | 10 A |
| C2-B | 90 | 10 | 65 | 61 | 349 A |
| C2-C | 70 | 30 | 90 | 60 | 10,000 |
| C2-D | 60 | 40 | 49 | 56 | 10,000 |

*"A" denotes adhesive failure

Examples 1-A to 1-C

Blends of EASTOFLEX E1060, tackifier resin, and mPP-3 were prepared in the proportions shown in Table 1 by mixing the three components in a 30 cm³ capacity BRABENDER batch mixer operating at 50 revolutions per minute for 10 minutes at 170° C. Total charge to the mixer was 20 grams. The resulting blends were placed between release liners and pressed into an approximately 36-micrometer-thick film according to the procedure described for Comparative Examples C1-A to C1-E. The tapes, thus formed, were tested for peel and shear properties according to the test methods, supra. The results are shown in Table 1.

TABLE 1

| Ex. | EASTOFLEX E1060 (parts by weight) | Tackifier (Amount in parts by weight) | mPP-3 (parts by weight) | 180° Peel Adhesion to Glass (N/dm) | 180° Peel Adhesion to PP (N/dm) | Room Temp. Shear Strength (minutes) |
|---|---|---|---|---|---|---|
| 1-A | 60 | REGALREZ 1126 (30) | 10 | 87 | 60 | 90 |
| 1-B | 45 | REGALREZ 1126 (30) | 25 | 108 | 41 | 338 |
| 1-C | 60 | WINGTACK PLUS (30) | 10 | 80 | 75 | 63 |

Examples 2-A to 2-D

Blends of EASTOFLEX E1200, REGALREZ 1126, and mPP-3 were prepared in the proportions shown in Table 2 by mixing the three components in a 30 cm³ capacity BRABENDER batch mixer operating at 50 revolutions per minute for 10 minutes at 170° C. Total charge to the mixer was 20 grams. The resulting blend was placed between release liners and pressed into an approximately 46-micrometer-thick film according to the procedure described for Comparative Examples C1-A to C1-E. The tapes thus formed were tested for peel and shear properties according to the test methods, supra. The results are shown in Table 2.

TABLE 2

| Ex. | EASTO-FLEX E1060 (parts by weight) | REGAL-REZ 1126 (parts by weight) | mPP-3 (parts by weight) | 180° Peel Adhesion to Glass (N/dm) | 180° Peel Adhesion to PP (N/dm) | Room Temperature Shear Strength (minutes) |
|---|---|---|---|---|---|---|
| 2-A | 70 | 30 | 0 | 95 | 106 | 253 |
| 2-B | 60 | 30 | 10 | 122 | 151 | 524 |
| 2-C | 45 | 30 | 25 | 119 | 147 | 1,832 |
| 2-D | 50 | 40 | 10 | 132 | 144 | 1,116 |

Examples 3-A and 3-B

Blends of EASTOFLEX E1060, WINGTACK PLUS, and mPP-3 were prepared in the proportions shown in Table 3 by mixing the three components in a 350 cm$^3$ capacity BRABENDER batch mixer operating at 50 revolutions per minute for 10 minutes at 150° C. Total charge to the mixer was 250 grams. The resulting blends were extruded at approximately 160° C. from a 3-zone, single-screw HAAKE extruder, having a 1.90 centimeter diameter and a length-to-diameter ratio (LID) of 25, which was connected to a 12.7 centimeter wide draw die maintained at 160° C. The die was shimmed to a 250 micrometer gap. The blends were extruded onto PET backings to the thicknesses shown in Table 3. Each film was then covered with a silicone-coated release liner. The tapes, thus formed, were tested for peel and shear properties according to the test methods, supra. The results are shown in Table 3.

TABLE 3

| Ex. | EASTO-FLEX E1060 (parts by weight) | WING-TACK PLUS (parts by weight) | mPP-3 (parts by weight) | Thickness (micrometers) | 180° Peel Adhesion to Glass (N/dm) | 180° Peel Adhesion to PP (N/dm) | Room Temperature Shear Strength (minutes) |
|---|---|---|---|---|---|---|---|
| 3-A | 45 | 30 | 25 | 46 | 60 | 71 | 684 |
| 3-B | 45 | 30 | 25 | 163 | 159 | 253 | 1,866 |

Examples 4-A and 4-B

Blends of EASTOFLEX E1200, REGALREZ 1126, and mPP-3 were prepared in the proportions shown in Table 4 by mixing the three components in a 350 cm$^3$ capacity BRABENDER batch mixer operating at 50 revolutions per minute for 10 minutes at 150° C. Total charge to the mixer was 250 grams. The resulting blends were extruded as described for Examples 3-A and 3-B (except the extruder and die temperatures were maintained at about 127° C.) onto PET backings to the thicknesses shown in Table 4. Then, the films were covered with a silicone-coated release liner. The tapes, thus formed, were tested for peel and shear properties according to the test methods, supra. The results are shown in Table 4.

TABLE 4

| Ex. | EASTO-FLEX E1200 (parts by weight) | REGAL-REZ 1126 (parts by weight) | mPP-3 (parts by weight) | Thickness (micrometers) | 180° Peel Adhesion to Glass (N/dm) | 180° Peel Adhesion to PP (N/dm) | Room Temperature Shear Strength* (minutes) |
|---|---|---|---|---|---|---|---|
| 4-A | 60 | 30 | 10 | 51 | 162 | 86 | 2,412 |
| 4-B | 60 | 30 | 10 | 163 | 189 | 188 | 4,290 A |

*"A" denotes adhesive failure

Examples 5-A to 5-H

Blends of KTAC 6013, WINGTACK PLUS, and mPP-3, in the proportions shown in Table 5, were prepared by mixing the three components in a 30 cm³ capacity BRABENDER batch mixer operating at 50 revolutions per minute for 10 minutes at 165–170° C. Total charge to the mixer was 20 grams. The resulting blends were placed between release liners and pressed into either an approximately 51- or 114-micrometer-thick film according to the procedure described for Comparative Examples C-1 to C-E. The tapes, thus formed, were tested for peel and shear properties according to the test methods, supra. The results are shown in Table 5.

TABLE 5

| Ex. | KTAC 6013 (parts by weight) | WING-TACK PLUS (parts by weight) | mPP-3 (parts by weight) | Thickness (micro-meters) | 180° Peel Adhesion to Glass (N/dm) | 180° Peel Adhesion to PP (N/dm) | 180° Peel Adhesion to HDPE (N/dm) | Room Temperature Shear Strength (minutes) |
|---|---|---|---|---|---|---|---|---|
| 5-A | 45 | 45 | 10 | 51 | 102 | 106 | 13 | 300 |
| 5-B | 60 | 30 | 10 | 51 | 93 | 92 | 69 | 500 |
| 5-C | 30 | 60 | 10 | 51 | 7 | 9 | 7 | 565 |
| 5-D | 45 | 30 | 25 | 51 | 86 | 103 | 156 | 500 |
| 5-E | 37.5 | 37.5 | 25 | 51 | 138 | 104 | 105 | 700 |
| 5-F | 30 | 45 | 25 | 51 | 132 | 150 | 110 | 1,000 |
| 5-G | 37.5 | 37.5 | 25 | 114 | NM | 186 | 185 | NM |
| 5-H | 30 | 45 | 25 | 114 | NM | 186 | 202 | NM |

NM = not measured

Example 6

Blends of EASTOFLEX E1060, WINGTACK PLUS, and mPP-1, in the proportions shown in Table 6, were prepared by mixing the three components and 0.3 part by weight of TRIAZINE CROSSLINKER per 100 parts by weight of the blend in a 30 cm³ capacity BRABENDER batch mixer operating at 50 revolutions per minute for 10 minutes at 150° C. Total charge to the mixer was 20 grams. The resulting blends were placed between release liners and pressed into an approximately 51-micrometer-thick film according to the procedures of Comparative Examples C-1A to C-1E. The tapes, thus formed, were tested for peel and shear properties according to the test methods, supra. The tapes were then exposed to ultraviolet (UV) radiation using an "H bulb" UV source from Fusion UV Curing; Rockville, Md., after which peel and shear property tests were again performed. The results are shown in Table 6.

TABLE 6

| Ex. | EASTOFLEX E1060 (parts by weight) | WING-TACK PLUS (parts by weight) | mPP-1 (parts by weight) | UV Dosage (mJ/cm²) | 180° Peel Adhesion to Glass (N/dm) | 180° Peel Adhesion to PP (N/dm) | Room Temperature Shear Strength (minutes) |
|---|---|---|---|---|---|---|---|
| 6-A | 60 | 30 | 10 | 0 | 102 | 72 | 99 |
| 6-B | 45 | 45 | 10 | 0 | 109 | 62 | 12 |
| 6-C | 30 | 60 | 10 | 0 | 2 | 0 | <2 |
| 6-D | 45 | 30 | 25 | 0 | 141 | 133 | 32 |
| 6-E | 37.5 | 37.5 | 25 | 0 | 112 | 114 | 16 |
| 6-F | 30 | 45 | 25 | 0 | 56 | 26 | 40 |
| 6-G | 60 | 30 | 10 | 500 | 122 | 116 | 112 |
| 6-H | 45 | 45 | 10 | 500 | 71 | 66 | 17 |
| 6-I | 30 | 60 | 10 | 500 | 0 | 0 | <2 |
| 6-J | 45 | 30 | 25 | 500 | 126 | 129 | 39 |
| 6-K | 37.5 | 37.5 | 25 | 500 | 151 | 146 | 88 |
| 6-L | 30 | 45 | 25 | 500 | 64 | 87 | 104 |

Example 7

Blends of EASTOFLEX E1060, WINGTACK PLUS, and mPP-2, in the proportions shown in Table 7, were prepared by mixing the three components and 0.3 part by weight of TRIAZINE CROSSLINKER per 100 parts by weight of the blend in a 30 cm³ capacity BRABENDER batch mixer at 50 revolutions per minute for 10 minutes at 150° C. Total charge to the mixer was 20 grams. The resulting blends were placed between release liners and pressed into approximately 127-micrometer-thick films according to the procedure of Comparative Examples C-1A to C-1E. The tapes, thus formed, were tested for peel and shear properties according to the test methods, supra, before and after being exposed to UV radiation from an "H bulb" UV source from Fusion UV Curing; Rockville, Md. The results are shown in Table 7.

TABLE 7

| Ex. | EASTOFLEX E1060 (parts by weight) | WINGTACK PLUS (parts by weight) | mPP-2 (parts by weight) | UV Dosage (mJ/cm²) | 180° Peel Adhesion to Glass (N/dm) | 180° Peel Adhesion to PP (N/dm) | Room Temperature Shear Strength (minutes) |
|---|---|---|---|---|---|---|---|
| 7-A | 60 | 30 | 10 | 0 | 129 | 73 | 920 |
| 7-B | 45 | 45 | 10 | 0 | 43 | 30 | 194 |
| 7-C | 30 | 60 | 10 | 0 | 3 | 2 | 473 |
| 7-D | 45 | 30 | 25 | 0 | 53 | 76 | 67 |
| 7-E | 37.5 | 37.5 | 25 | 0 | 44 | 72 | 43 |
| 7-F | 30 | 45 | 25 | 0 | 31 | 29 | 101 |
| 7-G | 60 | 30 | 10 | 500 | 122 | 128 | 39 |
| 7-H | 45 | 45 | 10 | 500 | 70 | 14 | 183 |
| 7-I | 30 | 60 | 10 | 500 | 5 | 1 | 653 |
| 7-J | 45 | 30 | 25 | 500 | 126 | 51 | 203 |
| 7-K | 37.5 | 37.5 | 25 | 500 | 107 | 21 | 219 |
| 7-L | 30 | 45 | 25 | 500 | 50 | 8 | 186 |

Comparative Examples C3-A to C3-H

Blends of 45 parts of EASTOFLEX E1200, 30 parts of REGALREZ 1126 tackifier resin, and 25 parts of commercially available amorphous polypropylene (APP) were prepared using the APPs shown in Table C3 by mixing the three components in an 30 cm³ capacity BRABENDER batch mixer operating at 50 revolutions per minute for 10 minutes at 170° C. Total charge to the mixer was 20 grams. The resulting blends were placed between release liners and pressed into approximately 51 and 127 thick films at 160° C. according to the procedure described for Comparative Examples C1-A to C1-E. The tapes, thus formed, were tested for peel and shear properties according to the test methods, supra. The results are shown in Table C3.

TABLE C3

| Ex. | APP Identity | Adhesive Thickness (micron) | 180° Peel Adhesion to Glass (N/dm) | 180° Peel Adhesion to PP (N/dm) | 180° Peel Adhesion to HDPE (N/dm) | Room Temperature Shear Strength (min) |
|---|---|---|---|---|---|---|
| C3-A | EASTOFLEX P1010 | 51 | 7.7 | 27.6 | 1.5 | 257 A |
| C3-B | EASTOFLEX P1023 | 51 | 1.1 | 8.5 | 0.9 | 115 A |
| C3-C | KTAC 2015 | 51 | 2.6 | 14.5 | 0.7 | 324 A |
| C3-D | REXTAC RT 2180 | 51 | 9.4 | 33.1 | 0.4 | 200 A |
| C3-E | EASTOFLEX P1010 | 127 | 4.8 | 77.5 | 2.6 | 555 A |
| C3-F | EASTOFLEX P1023 | 127 | 1.3 | 7.0 | 0.4 | 147 A |
| C3-G | KTAC 2015 | 127 | 4.6 | 69.6 | 1.8 | 725 A |
| C3-H | REXTAC RT 2180 | 127 | 2.0 | 48.8 | 3.1 | 993 A |

Various modifications and alterations of the invention will become apparent to those skilled in the art without departing from the spirit and scope of the invention, which is defined by the accompanying claims. It should be noted that steps recited in any method claims below do not necessarily need to performed in the order that they are recited. Those of ordinary skill in the art will recognize variations in performing the steps from the order in which they are recited.

What is claimed is:

1. A pressure-sensitive adhesive composition comprising a blend of:
   at least one amorphous ethylene/propylene-derived copolymer,
   at least one non-stereoregular propylene-derived polymer having a melt viscosity of greater than about 500 Poise, and
   optionally at least one tackifier.

2. The pressure-sensitive adhesive composition of claim 1, wherein the at least one propylene-derived polymer has a stereoregularity index of about 1.0 to about 5.0.

3. The pressure-sensitive adhesive composition of claim 1, wherein the at least one propylene-derived polymer comprises polypropylene.

4. The pressure-sensitive adhesive composition of claim 3, wherein the polypropylene is a metallocene-generated polypropylene.

5. The pressure-sensitive adhesive composition of claim 1, wherein the at least one ethylene/propylene-derived copolymer has a glass transition temperature (Tg) of greater than −40° C. to about 0° C.

6. The pressure-sensitive adhesive composition of claim 1, wherein the at least one ethylene/propylene-derived copolymer is derived from less than 30% by weight ethylene monomers.

7. The pressure-sensitive adhesive composition of claim 1, wherein the at least one ethylene/propylene-derived copolymer is derived from essentially no diene monomers.

8. The pressure-sensitive adhesive composition of claim 1, wherein the at least one ethylene/propylene-derived copolymer is derived from a major portion of propylene monomers.

9. The pressure-sensitive adhesive composition of claim 1, wherein the composition is crosslinked.

10. The pressure-sensitive adhesive composition of claim 1, wherein the at least one propylene-derived polymer has a weight average molecular weight of about 70,000 grams/mole to about 1,000,000 grams/mole.

11. The pressure-sensitive adhesive composition of claim 1, wherein the at least one propylene-derived polymer has a melt viscosity of greater than about 750 Poise.

12. The pressure-sensitive adhesive composition of claim 1, wherein the at least one propylene-derived polymer has a Tg of about −15° C. to about 10° C.

13. The pressure-sensitive adhesive composition of claim 1, wherein the at least one propylene-derived polymer is derived from essentially no diene monomers.

14. The pressure-sensitive adhesive composition of claim 1, wherein the at least one propylene-derived polymer is derived from at least about 60% by weight propylene monomers.

15. The pressure-sensitive adhesive composition of claim 1, wherein the at least one propylene-derived polymer has a weight average molecular weight of at least about 10,000 grams/mole.

16. The pressure-sensitive adhesive composition of claim 1, wherein the composition comprises a single domain system.

17. The pressure-sensitive adhesive composition of claim 1, wherein the composition comprises a major portion of the at least one amorphous ethylene/propylene-derived copolymer and a minor portion of the at least one propylene-derived polymer based on total weight of the ethylene/propylene-derived copolymer and propylene-derived polymer components.

18. An article comprising:
a substrate; and
a pressure-sensitive adhesive composition comprising a blend of:
at least one amorphous ethylene/propylene-derived copolymer,
at least one non-stereoregular propylene-derived polymer having a melt viscosity of greater than about 500 Poise, and
optionally at least one tackifier;
wherein the pressure sensitive adhesive is at least partially applied to the substrate.

19. The article of claim 18, wherein the substrate comprises polypropylene and the pressure-sensitive adhesive composition has a 180° peel adhesion to the substrate of at least about 100 N/dm.

20. The article of claim 18, wherein the substrate comprises polyethylene and the pressure-sensitive adhesive composition has a 180° peel adhesion to the substrate of at least about 100 N/dm.

21. The article of claim 18, wherein the substrate comprises glass and the pressure-sensitive adhesive composition has a 180° peel adhesion to the substrate of at least about 100 N/dm.

22. A tape comprising:
a backing having a first and second side; and
a pressure-sensitive adhesive composition comprising a blend of:
at least one amorphous ethylene/propylene-derived copolymer,
at least one non-stereoregular propylene-derived polymer having a melt viscosity of greater than about 500 Poise, and
optionally at least one tackifier;
wherein the pressure sensitive adhesive is applied on at least a portion of the first side of the backing and, optionally, on at least a portion of the second side of the backing.

23. A process for preparing a pressure-sensitive adhesive composition comprising the steps of:
providing at least one amorphous ethylene/propylene-derived copolymer,
providing at least one non-stereoregular propylene-derived polymer having a melt viscosity of greater than about 500 Poise,
optionally, adding at least one tackifier to the composition, and
blending the composition comprising the at least one amorphous ethylene/propylene-derived copolymer and the least one non-stereoregular propylene-derived polymer to form the pressure-sensitive adhesive composition.

* * * * *

UNITED STATES PATENT AND TRADEMARK OFFICE
CERTIFICATE OF CORRECTION

PATENT NO. : 6,489,400 B2
DATED : December 3, 2002
INVENTOR(S) : Ashish Kumar Khandpur It is certified that error appears in the above-identified patent and that said Letters Patent is hereby corrected as shown below:

Title page,
Item [56], References Cited, FOREIGN PATENT DOCUMENTS,
"WO 98/33858 9/1998" should be shown as -- WO 98/33858 8/1998 --

Column 5,
Lines 1 and 3, "mm and rr" should be in italics such as -- *mm* and *rr* --
Line 5, (2 instances) "mm and rr" should be in italics such as -- *mm* and *rr* --

Column 6,
Line 62, "about 0 C.," should be shown as -- about 0° C., --

Column 13,
Line 17, "KTAC. 6013" should be shown as -- KTAC 6013 --

Column 15,
Table 2, line 15, "EASTO-FLEX E1060" should be shown as -- EASTO-FLEX E1200 --

Column 16,
Line 14, "(LID)" should be shown as -- (L/D) --

Signed and Sealed this

Twentieth Day of January, 2004

JON W. DUDAS
*Acting Director of the United States Patent and Trademark Office*